United States Patent
Huemmer et al.

(10) Patent No.: US 8,607,457 B2
(45) Date of Patent: Dec. 17, 2013

(54) METHOD FOR WELDING COMPONENTS WITH A CLOSED HOLLOW CROSS-SECTION IN SUCH A WAY THAT A PERIPHERAL GAP IS PRODUCED BETWEEN THE TWO OVERLAPPING COMPONENTS

(75) Inventors: Ferdinand Huemmer, Zapfendorf (DE); Christof Vogel, Bischberg (DE)

(73) Assignee: Robert Bosch GmbH, Stuttgart (DE)

( * ) Notice: Subject to any disclaimer, the term of this patent is extended or adjusted under 35 U.S.C. 154(b) by 592 days.

(21) Appl. No.: 12/301,785

(22) PCT Filed: Jul. 27, 2007

(86) PCT No.: PCT/EP2007/057788
§ 371 (c)(1),
(2), (4) Date: May 10, 2011

(87) PCT Pub. No.: WO2008/025623
PCT Pub. Date: Mar. 6, 2008

(65) Prior Publication Data
US 2011/0204276 A1 Aug. 25, 2011

(30) Foreign Application Priority Data
Aug. 30, 2006 (DE) .......................... 10 2006 040 650

(51) Int. Cl.
*B23P 11/00* (2006.01)
*B23K 26/00* (2006.01)
(52) U.S. Cl.
USPC ...... 29/890.129; 29/515; 29/516; 219/121.64
(58) Field of Classification Search
USPC ............. 29/515, 516, 521, 890.129; 251/366; 219/121.64
See application file for complete search history.

(56) References Cited

U.S. PATENT DOCUMENTS 2,988,811 A * 6/1961 Huet .............................. 228/154
4,257,155 A * 3/1981 Hunter ............................ 29/511
(Continued)

FOREIGN PATENT DOCUMENTS

DE 511 461 10/1930
JP 1-258886 10/1989
(Continued)

OTHER PUBLICATIONS

PCT International Search Report for PCT/EP2007/057788, mailed on Oct. 22, 2007.

*Primary Examiner* — Alexander P Taousakis
(74) *Attorney, Agent, or Firm* — Kenyon & Kenyon LLP

(57) ABSTRACT

A method for joining a first housing component to a second housing component by welding, the first housing component and the second housing component each being constituted as hollow bodies having a closed hollow cross section, a shape of the hollow cross section of the second component corresponding to a shape of the hollow cross section of the first component, including: making available the first housing component having a first inside dimension, making available the second housing component having an outside dimension, the outside dimension of the second housing component being smaller than the inside dimension of the first component, disposing the second housing component in the first housing component so that a peripheral gap is constituted between an inner wall of the first housing component and an outer wall of the second housing component, the region having a gap between the two housing components being a joining region, and welding the first housing component to the second housing component in the region of the gap between the first and the second housing component. A housing for an injection valve that is manufactured in accordance with the method.

10 Claims, 2 Drawing Sheets

(56) References Cited

U.S. PATENT DOCUMENTS

| | | | |
|---|---|---|---|
| 4,682,002 A * | 7/1987 | Delle Piane et al. | 219/121.64 |
| 5,626,776 A | 5/1997 | Morris, Jr. | |
| 6,403,916 B1 * | 6/2002 | Spooner et al. | 219/121.63 |
| 6,421,913 B1 * | 7/2002 | Bonnah et al. | 29/888.46 |
| 6,579,626 B1 * | 6/2003 | Ottinger et al. | 428/626 |
| 6,693,254 B2 * | 2/2004 | Menin | 219/121.63 |
| 7,385,156 B2 * | 6/2008 | Nozue et al. | 219/107 |
| 7,617,605 B2 * | 11/2009 | Fochtman et al. | 29/890.131 |
| 7,930,825 B2 * | 4/2011 | Fochtman et al. | 29/890.131 |
| 2001/0015013 A1 | 8/2001 | Kato et al. | |
| 2011/0192824 A1 * | 8/2011 | Vestergaard et al. | 219/121.64 |

FOREIGN PATENT DOCUMENTS

| | | |
|---|---|---|
| JP | H 02-268990 | 11/1990 |
| JP | 5-50294 | 3/1993 |
| JP | 09 096264 | 4/1997 |
| JP | 2002-327660 | 11/2002 |
| JP | 2004-095824 | 3/2004 |
| JP | 2005-319482 | 11/2005 |
| JP | 2008-544145 | 12/2008 |
| WO | 2006/138665 | 12/2006 |
| WO | 2006/138712 | 12/2006 |

* cited by examiner

METHOD FOR WELDING COMPONENTS WITH A CLOSED HOLLOW CROSS-SECTION IN SUCH A WAY THAT A PERIPHERAL GAP IS PRODUCED BETWEEN THE TWO OVERLAPPING COMPONENTS

FIELD OF THE INVENTION

The present invention relates to a method for joining components having a closed hollow cross section, and to a housing for an injection valve that is manufactured in accordance with the method according to the present invention.

BACKGROUND INFORMATION

It is known to join two components having a hollow cross section by welding. In this context, the joining region between the two components is designed in such a way that an inside dimension of a first component participates in a press fit with an outside dimension of a second component. No gap is therefore provided in the joining region between the two components. It has now been found that problems occur at the weld seam if the two components do not have a clean surface. The components can have, for example, residues of lubricants, for example oil or naphtha, on the component surface. These residues are thus present in the joining region between the first and the second component. These residues then outgas upon welding and, for lack of any other possibility, escape through the weld bath. This causes the formation of pores in the weld seam which can assume, in particular, a tubular shape that can extend as far as the external surface of the weld seam. A leak can occur in the weld seam as a result; this is undesirable. The surfaces of the components to be welded must therefore be cleaned and free of residues before the welding operation.

SUMMARY OF THE INVENTION

The method according to the present invention, having the features described herein, for joining two components having a hollow cross section has, in contrast, the advantage that leaks cannot occur at the weld seam. With the method according to the present invention it is furthermore possible to dispense with a step of cleaning the surfaces to be joined before welding.

This is achieved, according to the exemplary embodiments and/or the exemplary methods of the present invention, in that a first component to be joined and having a closed cross section has an inside dimension that is larger than an outside dimension of a second component to be joined and having a closed cross section in such a way that a peripheral gap is present between the inside dimension of the first component and the outside dimension of the second component. This gap enables any residues present on the surfaces of the components to be joined to outgas at the beginning of the welding operation, so that said residues cannot result in problems as the welding process proceeds. Outgassing occurs because of the heat evolved during welding, and is complete before the welding beam encounters any residues that may be adhering to the wall surfaces of the components. The gap closes up during the welding operation because of the heating and softening of the joining regions of the components, so that a defect-free weld is possible.

Other exemplary refinements of the present invention are described herein.

The peripheral gap may have a uniform thickness respectively along its circumferential direction and along its length in the direction of a center axis of the components. A continuous and reliable welding operation can thereby be ensured.

According to another embodiment of the invention, the gap is embodied in tapering, in particular conical, fashion. The tapering gap is embodied in regular fashion with the same geometry along its circumference.

The welding procedure may be laser welding.

Particularly, the first and second components to be joined may each have a circular cross section. The components can be manufactured, for example, by deep drawing, or by rolling and connection at a butting point.

The gap may have a thickness from approx. $1/100$ to approx. $50/100$, and which may be approx. $1/10$, of the wall thickness of the outer component to be joined.

Particularly, the welding procedure may be embodied in such a way that the welding operation is carried out simultaneously at multiple positions by way of multiple welding devices. Processing time can thereby be reduced.

In order to provide secure immobilization of the first and the second component during the welding operation, a compression connection region is disposed between the first and the second component adjacent to the gap region. The two components to be joined can thus be inserted into one another, and are held by the compression connection region in predetermined positions relative to one another. In a subsequent step, the welding operation can then begin.

Additionally, the first and the second component may be manufactured from a thin sheet material. The two components may have an identical sheet thickness.

The exemplary embodiments and/or the exemplary methods of the present invention further relates to a housing for an injection valve that is manufactured in accordance with the method according to the present invention. A housing according to the present invention for an injection valve encompasses a first housing component and a second housing component, each of which has a closed hollow cross section. The two housing components are joined to one another at a joining region by welding. At the joining region, an inside dimension of the first housing component is larger than an outside dimension of the second housing component in such a way that before welding, a gap is present between the first and the second housing component.

As a result, residues that may be present on the surfaces in the joining region of the housing components outgas through the gap as a result of the heat generated during welding, and thus do not cause problems in the weld seam, e.g. due to the formation of pores or the like. The gap becomes closed during welding, so that the weld seam is located between the first and the second housing component.

In further fashion, the housing may encompass a compression connection region at which the first and the second housing component are additionally connected by way of a compression connection. The compression connection region may be disposed adjacent to the joining region.

The gap between the first and the second housing component before welding may be constituted with a uniform thickness in the longitudinal direction of the housing components, or in tapering, in particular conical, fashion.

A hollow cross section of the first and the second housing component may be circular in each case. In other words, the housing components may be embodied in cylindrical fashion. Alternatively, the housing components can also have an oval hollow cross section.

Exemplary embodiments of the present invention are described below in detail with reference to the accompanying drawings.

DETAILED DESCRIPTION

A method and a housing according to a first exemplifying embodiment of the invention will be described in detail below with reference to FIGS. 1 and 2.

Figure 1:
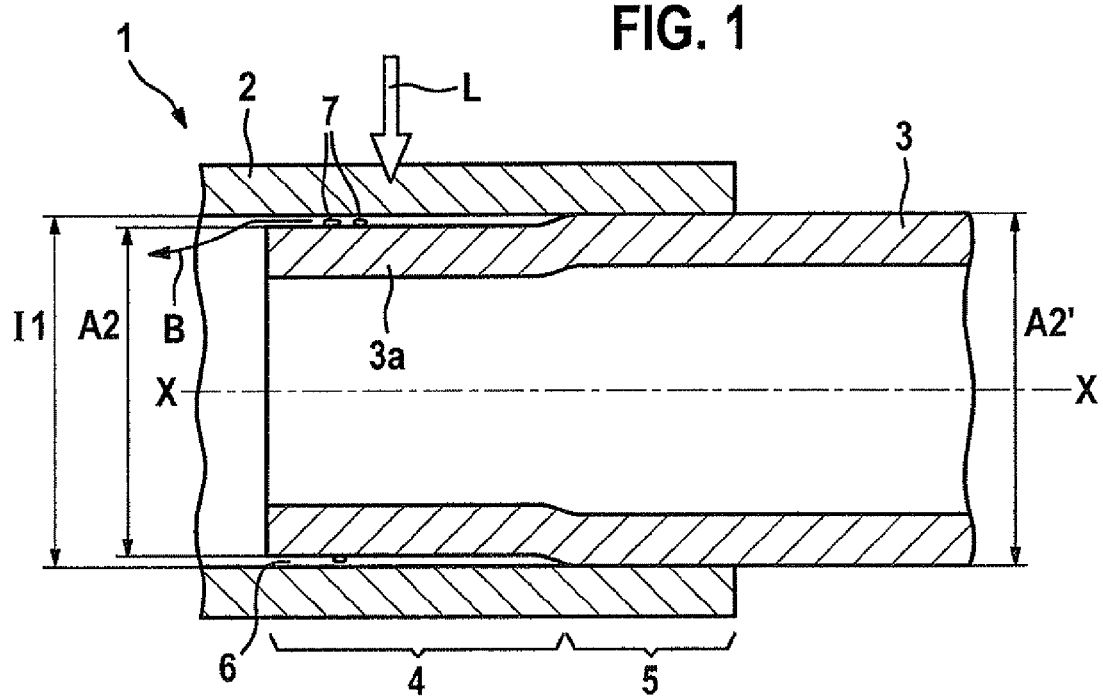
FIG. 1 shows a schematic sectioned view of a housing for an injection valve before a welding step, according to a first exemplifying embodiment of the invention.
Figure 2:
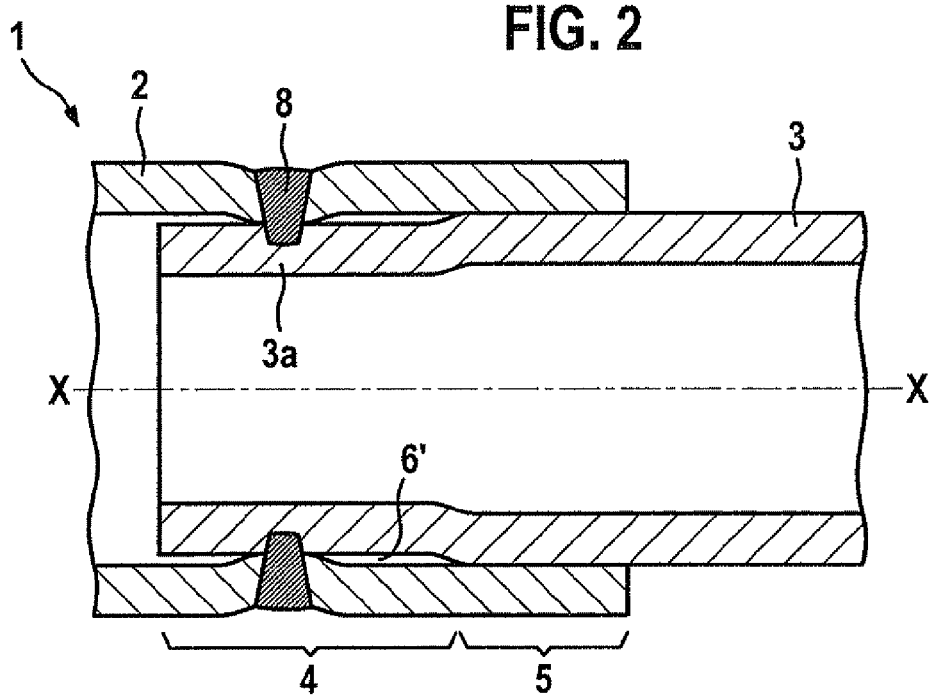
FIG. 2 shows a schematic sectioned view of the housing shown in FIG. 1, after the welding operation.

As FIG. 1 shows, a housing 1 encompasses a first housing component 2 and a second housing component 3. The two housing components 2, 3 are constituted as hollow cylindrical bodies having a circular cross section. First housing component 2 has a uniform inside diameter I1. Second housing component 3 has an end region 3a that has an outside diameter A2. End region 3a thus has a diameter that is somewhat smaller than a remaining diameter A2' of second housing component 3. Because of the reduced outside diameter of end region 3a of second housing component 3, a peripheral gap 6 therefore results, as shown in FIG. 1, between first housing component 2 and second housing component 3 when the two housing components 2, 3 are in the assembled state. Gap 6 has a constant width in the circumferential direction. Gap 6 furthermore has a constant length in axial direction X-X of the housing. The length of gap 6 in axial direction X-X corresponds to a joining region 4 between the first and the second housing component 3. At joining region 4, first housing component 2 is connected to second housing component 3 by laser welding. Housing 1 furthermore encompasses a compression connection region 5 that is disposed immediately adjacent to joining region 4. In compression connection region 5, a press fit is constituted between first housing component 2 and second housing component 3.

The method according to the present invention for joining housing components 2, 3 to produce housing 1 will be described below. In a first step, the two housing components 2, 3 are manufactured, for example, by deep drawing. An inside diameter I1 of first housing component 2 is selected in such a way that it is larger than an outside diameter A2 of second housing component 3 at end region 3a of second housing component 3. An outside diameter A2' of second housing component 3 is also selected in such a way that it can participate in a press fit together with inside diameter I1 of first housing component 2. In a subsequent step, second housing component 3 is inserted into first housing component 2. This produces a compression connection between the two housing components at compression connection region 5. A constant peripheral gap 6, having a uniform gap width in the radial direction, is furthermore produced between the two housing components 2, 3 at joining region 4.

If residues 7 are present on the surfaces of first and second housing component 2, 3 in joining region 4, as shown in FIG. 1, said residues are in communication with the external environment via gap 6. Residues can result, for example, from the previous manufacturing step in which, for example, oil or naphtha is used as a lubricant for deep drawing. Compression connection region 5 ensures that relative positioning between first housing component 2 and second housing component 3 is defined. Be it noted that compression connection region 5 can in principle be omitted, and the two housing components 2, 3 can be held for the subsequent welding step using a holding apparatus. Greater technical complexity for the retaining apparatus is, however, necessary for this purpose.

In a subsequent step, welding of the two housing components 2, 3 to one another takes place. In FIG. 1, arrow L indicates a laser beam with which the welding operation is performed. Laser beam L first strikes the outer side of first housing component 2. As a result of the heat evolution occurring in this context, residues 7 present on the housing surfaces in gap 6 are converted into a gaseous state. These now gaseous residues can outgas from gap 6 into the environment as indicated by arrow B in FIG. 1. When the actual welding operation between first and second housing component 2, 3 then begins, there are thus no further residues 7 on the surfaces in joining region 4 of housing components 2, 3.

A secure welded connection 8 between first and second housing component 2, 3 can thereby be achieved. Housing components 2, 3 are welded along the entire circumference of the housing components, in which context either the laser or the assembled housing components 2, 3 can be rotated. It is also possible to use several lasers simultaneously, which begin the welding operation at different locations on the circumference. FIG. 2 shows the final state of housing 1, in which the two housing components 2, 3 are joined to one another by welding. As shown in FIG. 2, welded connection 8 is located approximately at the center of joining region 4.

This results in an enclosed region 6', which is a former gap region, between the two housing components 2, 3. This region 6' has no effects, however, on the welded connection between the two housing components 2, 3. Be it noted that the formation of this region 6' can be prevented if welded connection 8 is provided in a portion of joining region 4 that is located closer to compression connection region 5. It is of course also possible for end region 3a of second housing component 3, which region is located in joining region 4, to have the shortest possible length in axial direction X-X of the housing. The length of this end region 3a may be selected in such a way that it corresponds to or is somewhat greater than the extension of welded connection 8 in axial direction X-X. Housing 1 according to the present invention shown in FIG. 2 thus has a double connection, namely welded connection 8 and a compression connection in compression connection region 5.

Figure 3:
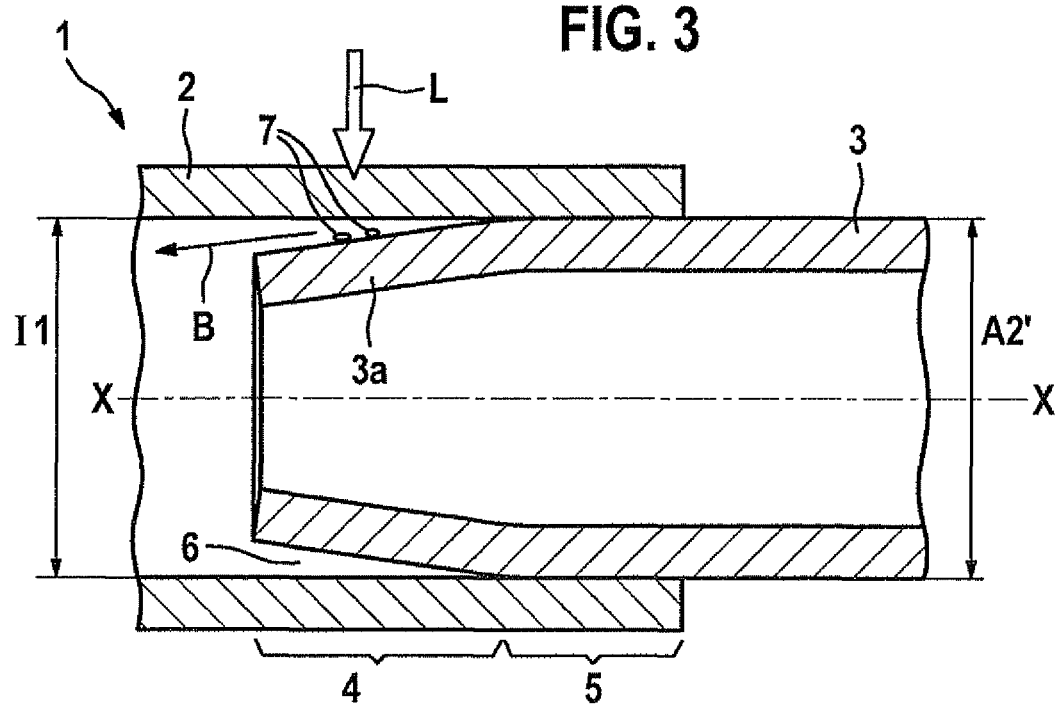
FIG. 3 shows a schematic sectioned view of a housing for an injection valve before a welding step, according to a second exemplifying embodiment of the invention.
Figure 4:
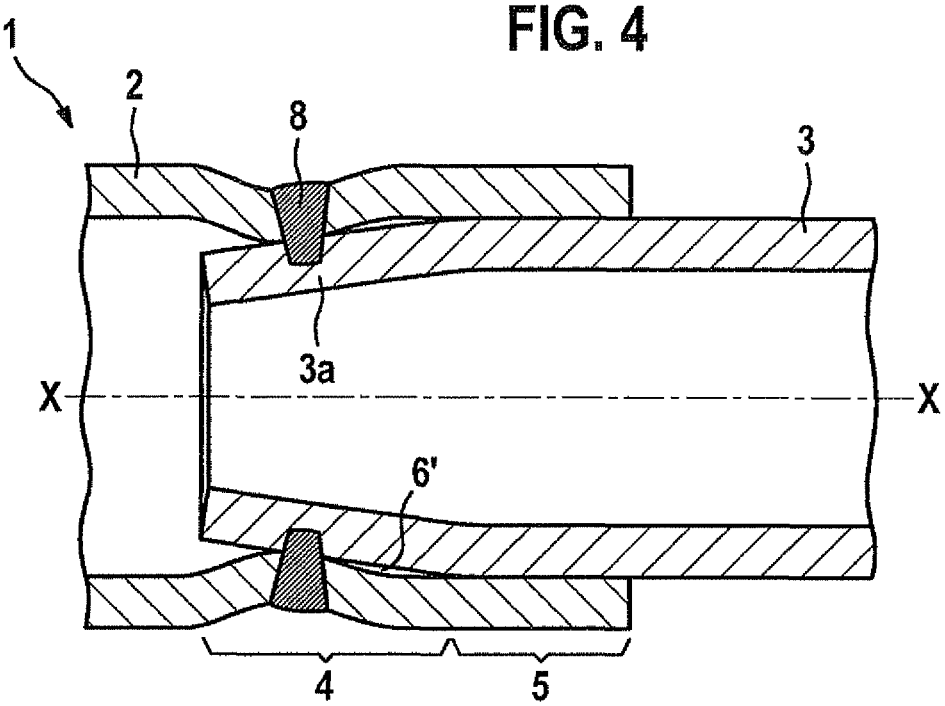
FIG. 4 shows a schematic sectioned view of the housing shown in FIG. 3 in the welded state.

A method and a housing according to a second exemplifying embodiment of the invention will be described in detail below with reference to FIGS. 3 and 4. Identical or functionally identical parts are labeled with the same reference characters as in the first exemplifying embodiment.

The second exemplifying embodiment corresponds substantially to the first embodiment; in contrast thereto, gap 6 is embodied differently. As shown in FIG. 3, gap 6 of the second exemplifying embodiment is constituted by a conically tapering end region 3a of second housing component 3. Gap 6 thus has a wedge shape in section. Gap 6 is once again embodied uniformly along the circumference of second housing component 3, and tapers from the end of end region 3a located at first housing component 2 to compression connection region 5.

FIG. 4 again shows the completed housing with welded connection 8 between first and second housing component 3. Welded connection 8 is once again disposed adjacent to compression connection region 5. As in the first exemplifying embodiment, outgassing of residues 7 can be enabled by the provision of gap 6, as indicated by arrow B. Because gap 6 widens in the outgassing direction, the gaseous residues can be removed particularly reliably. This exemplifying embodi-

What is claimed is:

1. A method for joining a first housing component to a second housing component by welding, the method comprising:
providing the first housing component having a first inside dimension, the first housing component and the second housing component each being constituted as hollow bodies having a closed hollow cross section, a shape of the hollow cross section of the second component corresponding to a shape of the hollow cross section of the first component;
providing the second housing component having an outside dimension, the outside dimension of the second housing component being smaller than the inside dimension of the first component;
disposing the second housing component in the first housing component so that a peripheral gap is constituted between an inner wall of the first housing component and an outer wall of the second housing component, the region having a gap between the two housing components being a joining region; and
welding the first housing component to the second housing component in the region of the gap between the first and the second housing component;
wherein the welding causes the gap adjacent to the weld to close.

2. The method of claim 1, wherein the peripheral gap has a uniform thickness respectively along its circumferential direction and along its length in an axial direction of the housing components.

3. The method of claim 1, wherein the gap is embodied in a conically tapering manner.

4. The method of claim 1, wherein the welding procedure is laser welding.

5. The method of claim 1, wherein the first and the second component each have a circular cross section.

6. The method of claim 1, wherein the welding procedure is carried out simultaneously at multiple positions on a circumference of the housing components.

7. The method of claim 1, wherein a compression connection region is constituted between the first and the second component, the compression connection region being disposed adjacent to the joining region, to provide relative positioning between the first and the second component before the welding.

8. The method of claim 1, wherein the first and the second housing component are made from a sheet material.

9. The method of claim 1, wherein the gap has a thickness from approximately $1/100$ to approximately $1/10$ of a wall thickness of the first housing component.

10. A method for joining a first housing component to a second housing component by welding, the method comprising:
providing the first housing component having a first inside dimension, the first housing component and the second housing component each being constituted as hollow bodies having a closed hollow cross section, a shape of the hollow cross section of the second component corresponding to a shape of the hollow cross section of the first component;
providing the second housing component having an outside dimension, the outside dimension of the second housing component being smaller than the inside dimension of the first component;
disposing the second housing component in the first housing component so that a peripheral gap is constituted between an inner wall of the first housing component and an outer wall of the second housing component, the region having a gap between the two housing components being a joining region; and
welding the first housing component to the second housing component in the region of the gap between the first and the second housing component;
wherein the welding is produced in a radial direction, starting from an outer side of the first housing component through the wall of the first housing component as well as all the way through the gap via the outer side having the dimension of the second housing component into the second housing component, the first housing component in the region of the welding being drawn in all the way to the outer wall of the second housing component, at the beginning of the welding, because of a heat development of the welding on the surfaces of the housing components that are to be joined, residues that are present are able to undergo gas drainage and then, during the welding, based on the heating and a softening of the housing components in the joining region, the gap adjacent to the weld closes.

* * * * *

UNITED STATES PATENT AND TRADEMARK OFFICE
CERTIFICATE OF CORRECTION

PATENT NO. : 8,607,457 B2  Page 1 of 1
APPLICATION NO. : 12/301785
DATED : December 17, 2013
INVENTOR(S) : Huemmer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1263 days.

Signed and Sealed this
Twenty-second Day of September, 2015

Michelle K. Lee
*Director of the United States Patent and Trademark Office*